US009261160B2

(12) United States Patent
Lee et al.

(10) Patent No.: US 9,261,160 B2
(45) Date of Patent: Feb. 16, 2016

(54) PISTON VALVE OF SHOCK ABSORBER

(71) Applicant: MANDO CORPORATION, Pyeongtaek-si, Gyeonggi-do (KR)

(72) Inventors: Jin Kee Lee, Iksan-si (KR); Kyong Hag Yoon, Gunsan-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 13/965,814

(22) Filed: Aug. 13, 2013

(65) Prior Publication Data

US 2014/0048366 A1 Feb. 20, 2014

(30) Foreign Application Priority Data

Aug. 14, 2012 (KR) ........................ 10-2012-0088813

(51) Int. Cl.
*F16F 9/34* (2006.01)
*F16F 9/512* (2006.01)

(52) U.S. Cl.
CPC ................. *F16F 9/34* (2013.01); *F16F 9/5126* (2013.01)

(58) Field of Classification Search
CPC ......... F16F 9/5126; F16F 9/348; B60G 17/08
USPC ............... 188/275, 280, 283, 322.13, 322.15, 188/282.6, 281, 282.1, 282.5, 282.8, 284, 188/286, 316, 317, 304, 312
See application file for complete search history.

(56) References Cited

U.S. PATENT DOCUMENTS

| | | | | |
|---|---|---|---|---|
| 5,248,014 | A * | 9/1993 | Ashiba | 188/282.8 |
| 6,561,326 | B2 * | 5/2003 | Gotz | 188/322.15 |
| 7,172,058 | B2 * | 2/2007 | Burkert et al. | 188/315 |
| 7,441,639 | B2 * | 10/2008 | Gotz et al. | 188/316 |
| 2005/0133319 | A1 * | 6/2005 | Wilhelm | 188/281 |
| 2006/0283675 | A1 * | 12/2006 | Teraoka et al. | 188/298 |
| 2007/0125610 | A1 * | 6/2007 | Goetz et al. | 188/282.1 |
| 2009/0145708 | A1 * | 6/2009 | Kim | 188/322.15 |
| 2013/0020158 | A1 * | 1/2013 | Park | 188/280 |

FOREIGN PATENT DOCUMENTS

| | | | | |
|---|---|---|---|---|
| DE | 102004014395 | A1 * | 11/2004 | F16F 9/3221 |
| JP | 55126139 | A * | 9/1980 | F16F 13/00 |
| JP | 03129137 | A * | 6/1991 | F16F 9/50 |
| KR | 10-0489417 | B1 | 5/2005 | |

* cited by examiner

*Primary Examiner* — Bradley King
*Assistant Examiner* — Stephen Bowes
(74) *Attorney, Agent, or Firm* — McDermott Will & Emery LLP

(57) ABSTRACT

Provided is a piston valve of a shock absorber which can achieve both an effect of varying an attenuation force according to a pressure and an effect of varying an attenuation force according to a frequency region. The piston valve includes: a main valve unit coupled to a lower end of a piston rod formed with an orifice hole, to divide an inside of a cylinder into an extension chamber and a compression chamber, the main valve unit generating an attenuation force according to a difference of pressure between the extension chamber and the compression chamber; and a frequency sensitive valve unit installed at one side of the main valve unit and configured to generate an attenuation force according to a frequency of hydraulic fluid delivered through the orifice hole of the piston rod, wherein the frequency sensitive valve unit is installed within the main valve unit.

8 Claims, 4 Drawing Sheets

100
11
12
13
400
111
200
350
330
300
340
420
310
322
211
410
321
210
212
220
330
340
230
350
14
511
520
512
550
540
530
510
500

-- Prior Art --

-- Prior Art --

PISTON VALVE OF SHOCK ABSORBER

BACKGROUND OF THE INVENTION

1. Field of the Invention

The present invention relates to a piston valve, and more particularly, to a piston valve of a shock absorber in which a frequency sensitive valve unit is installed inside of a pressure sensitive main valve unit to reduce the entire length of the piston valve.

2. Description of the Prior Art

In general, a vehicle continuously receives vibration or a shock from a road surface through the wheels during driving. Thus, a shock absorbing device is provided between the vehicle body and the vehicle axle so as to prevent the shock or vibration from being directly transferred to the vehicle body, thereby improving ride comfort. In addition, the shock absorbing device suppresses the irregular vibration of the vehicle body, so as to enhance the driving stability.

A suspension system, which is a general name of a connection device between a vehicle axle and a vehicle body including the shock absorbing device as described above, includes a chassis spring configured to relieve shock, a shock absorber configured to control the free vibration of the chassis spring so as to improve ride comfort, a stabilizer configured to prevent rolling, a rubber bushing, and a control arm.

In the suspension system, especially, the shock absorber serves to suppress and attenuate vibration from the road surface and is mounted between the vehicle body or a frame and a wheel. In particular, the shock absorber absorbs the vibration energy of the vehicle body in the vertical direction, so as to suppress vibration, improve the ride comfort, and protect cargo on board. In addition, the shock absorber increases the service life of the vehicle by reducing dynamic stresses at each portion of the vehicle body and secures tires' road holding by suppressing the motion of a mass below the spring. Furthermore, the shock absorber improves the motional performance of the vehicle by suppressing change in the vehicle's posture caused by an inertial force.

Accordingly, the ride comfort and handling stability of the vehicle may be suitably adjusted according to the attenuation force characteristic of the shock absorber. That is, during the normal driving of the vehicle, it may be needed to reduce the attenuation force so as to improve ride comfort. Further, when quickly turning the vehicle or during the high-speed driving of the vehicle, it may be needed to increase the attenuation force so as to enhance the handling stability.

FIG. 1 illustrates a conventional shock absorber.

As illustrated in FIG. 1, the shock absorber 1 includes a cylinder 2 filled with hydraulic fluid, a piston rod 3 of which one end is positioned inside the cylinder 2 and the other end extends to the outside of the cylinder 2, and a piston valve 4 mounted at the one end of the piston rod 3 to reciprocate in the cylinder 2.

The cylinder 2 may include an inner tube 2*a* and an outer tube 2*b*, and a base valve 5 is installed at the lower end of the cylinder 2 to face the piston valve 4.

The inside of the cylinder 2 is divided into an extension chamber C1 and a compression chamber C2 by the piston valve 4. When the piston valve 4 reciprocates up and down within the cylinder 2, the hydraulic fluid flows from the extension chamber C1 to the compression chamber C2 or from the compression chamber C2 to the extension chamber C1 through an orifice (not shown) formed in the piston valve 4, thereby generating an attenuation force.

The conventional shock absorber 1 configured as described above is adapted to generate the attenuation force using a pressure difference between the extension chamber C1 and the compression chamber C2 which occurs according to the rectilinear reciprocation of the piston rod 3 connected to the vehicle body. Thus, when the moving stroke of the piston rod 3 is large or at a low frequency shock region, a proper attenuation force is generated to smoothly absorb vibration. However, when the moving stroke of the piston rod 3 is small or at a high frequency shock region, a proper attenuation force may not be obtained.

Thus, a frequency sensitive shock absorber has been developed in which the attenuation force may be adjusted according to the variation of shock frequency as well as the shock input speed. As an example of such a frequency sensitivity shock absorber, FIG. 2 illustrates a shock absorber for a vehicle disclosed in Korean Patent No. 10-0489417 (Patent Document 1).

The shock absorber 20 for a vehicle illustrated in FIG. 2 includes: a first communication bore 32 formed in the lower portion of a piston rod 31 so as to allow an extension chamber 23 and a compression chamber 24 to communicate with each other within a cylindrical tube 22; a valve body 33 including a first body 33*a* and a second body 33*b* which are coupled to each other at the lower end of the piston rod 31 to form a space 34 inside of the first body 33*a* and the second body 33*b*, each of the first body 33*a* and the second body 33*b* having a second communication bore 35, which is formed through the first body 33*a* and the second body 33*b* and at the top and bottom of the space 34, so as to allow the first communication bore 32 and the compression chamber 24 to communicate with each other; and a balancing weight 36 installed within the space 34 of the valve body 33 to be movable up and down by a pair of springs 37 and 38 so as to open or close the second communication bore 35.

Thus, when the moving stroke of the piston rod 31 is small or a high frequency shock is applied, the fluid within the extension chamber 23 and the compression chamber 24 is circulated within the compression chamber 24 and the extension chamber 23 through the first communication bore 32 formed through the piston rod 31 and the second communication bore 35 formed through the valve body 33 to absorb the shock, even if a disk 28 for opening or closing fluid channels 26 and 27 formed in the piston valve 25 does not operate.

However, in the above-described frequency sensitive shock absorber 20, a frequency sensitive valve is separately installed below the conventional pressure sensitive piston valve 25 to be spaced apart from and in series to the pressure sensitive piston valve 25. Thus, the entire length of the shock absorber 20 increases. In addition, the degree of design freedom of the shock absorber 20 may be limited due to the increase of manufacturing time and costs and the problem of installation space.

In addition, when a low frequency and high amplitude shock occurs in a moment, the shock should be sufficiently absorbed. However, since the shock absorber 20 illustrated in FIG. 2 relies only on the operation of the conventional piston valve 25, such a momentary low frequency and high amplitude shock cannot be sufficiently relieved.

Furthermore, there is a problem in that, when the balancing weight 36 is moved up and down due to a high frequency vibration, friction sounds may be generated due to the contact between the windings of the springs 37 and 38.

PRIOR ART DOCUMENT

Patent Document 1: Korean Patent Registration No. 10-0489417 (registered on May 3, 2005)

SUMMARY OF THE INVENTION

Accordingly, the present invention has been made to solve the above-mentioned problems occurring in the prior art, and an exemplary embodiment of the present invention is directed to a piston valve of a shock absorber, which can achieve both an effect of varying an attenuation force according to a pressure and an effect of varying an attenuation force according to a frequency region.

Also, an exemplary embodiment of the present invention is directed to a piston valve of a shock absorber, which includes both a pressure sensitive valve unit and a frequency sensitive valve unit but does not limit the degree of design freedom according to the increase of the entire length of the shock absorber.

In addition, an exemplary embodiment of the present invention is directed to a piston valve of a shock absorber, which can sufficiently absorb and relieve a momentary low frequency and high amplitude shock.

Furthermore, an exemplary embodiment of the present invention is directed to a piston valve of a shock absorber, which can prevent the occurrence of spring friction sounds in a frequency sensitive valve.

According to an exemplary embodiment of the present invention, there is provided a piston valve of a shock absorber. The piston valve includes: a main valve unit coupled to a lower end of a piston rod formed with an orifice hole, to divide an inside of a cylinder into an extension chamber and a compression chamber, the main valve unit generating an attenuation force according to a difference of pressure between the extension chamber and the compression chamber; and a frequency sensitive valve unit installed at one side of the main valve unit and configured to generate an attenuation force according to a frequency of hydraulic fluid delivered through the orifice hole of the piston rod, wherein the frequency sensitive valve unit is installed within the main valve unit.

In the piston valve, a valve housing having a space which communicates with the orifice hole may be coupled to the lower end of the piston rod, the main valve unit may be coupled to an outer circumferential surface of the valve housing, and the frequency sensitive valve unit may be installed in the space of the valve housing.

The valve housing and the main valve unit may be integrally formed.

Further, in the piston valve, the frequency sensitive valve unit may include a free piston which vertically divides the space into an upper chamber and a lower chamber, and a pair of elastic members provided at a top side and a bottom side of the free piston, respectively.

The piston valve may further include a sub-valve unit coupled to a lower end of the space in the valve housing, the sub-valve unit having at least one orifice formed through the sub-valve unit, wherein the lower chamber and the compression chamber communicate with each other through the at least one orifice.

Since the piston valve of the shock absorber according to the exemplary embodiment of the present invention includes a pressure sensitive main valve unit, a sub-valve unit, and a frequency sensitive valve unit, the piston valve can achieve both an effect of varying an attenuation force according to a pressure and an effect of an attenuation force according to a frequency region.

In addition, since the main valve unit is coupled to the outer circumferential surface of the valve housing, and the frequency sensitive valve unit and the sub-valve unit are installed together within the valve housing, it is possible to solve the problem of increase of the entire length in the conventional shock absorber due to the serial installation of the pressure sensitive valve and the frequency sensitive valve.

Further, since a momentary low frequency and high amplitude shock may be sufficiently adsorbed and relieved and occurrence of spring friction sounds in the frequency sensitive valve may be prevented, an emotional quality improving effect may be obtained.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
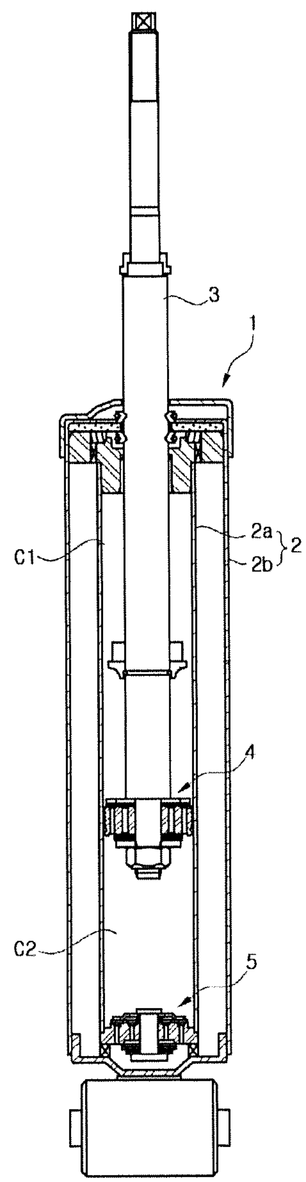
FIG. 1 is a cross-sectional view of a conventional shock absorber.

Hereinafter, an exemplary embodiment of a piston valve of a shock absorber according to an exemplary embodiment will be described with reference of the accompanying drawings. In the drawings, the thicknesses of lines shown in the drawings, the sizes of components or the like may be exaggeratively indicated for the clarity and convenience of description.

In addition, the terms used in the following description are those defined in consideration of the functions thereof and may be varied according to an intention of a user or an operator or a practice. Thus, the definitions of the terms should be made based on the contents over the entirety of the present specification.

Furthermore, the exemplary embodiments described below are not intended to limit the scope of the present invention but merely to exemplify configurational elements defined in the claims. An embodiment which belongs to the technical idea described over the entirety of the present specification and includes a configurational element capable of being substituted for a configurational element in the claims as an equivalent may be included in the scope of the present invention.

Embodiments

Figure 3:
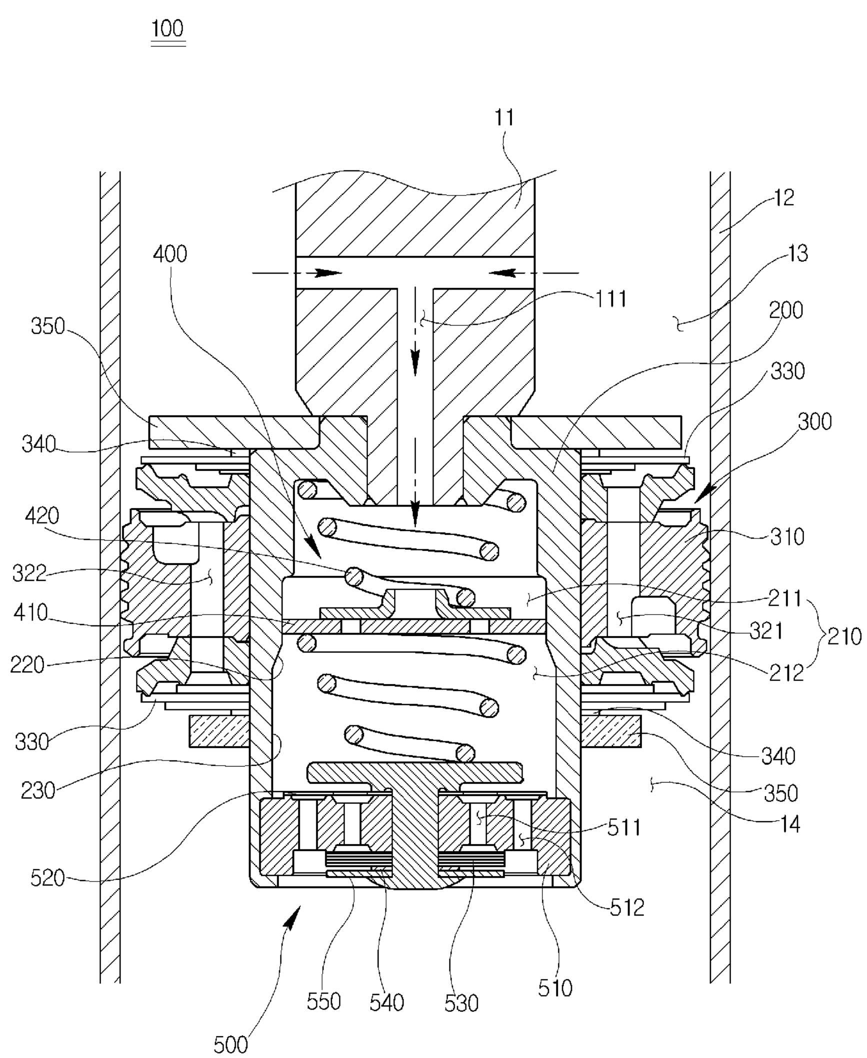
FIG. 3 is a cross-sectional view illustrating the operating state of a piston valve of a shock absorber according to an exemplary embodiment of the present invention when a high frequency shock is input.
Figure 4:
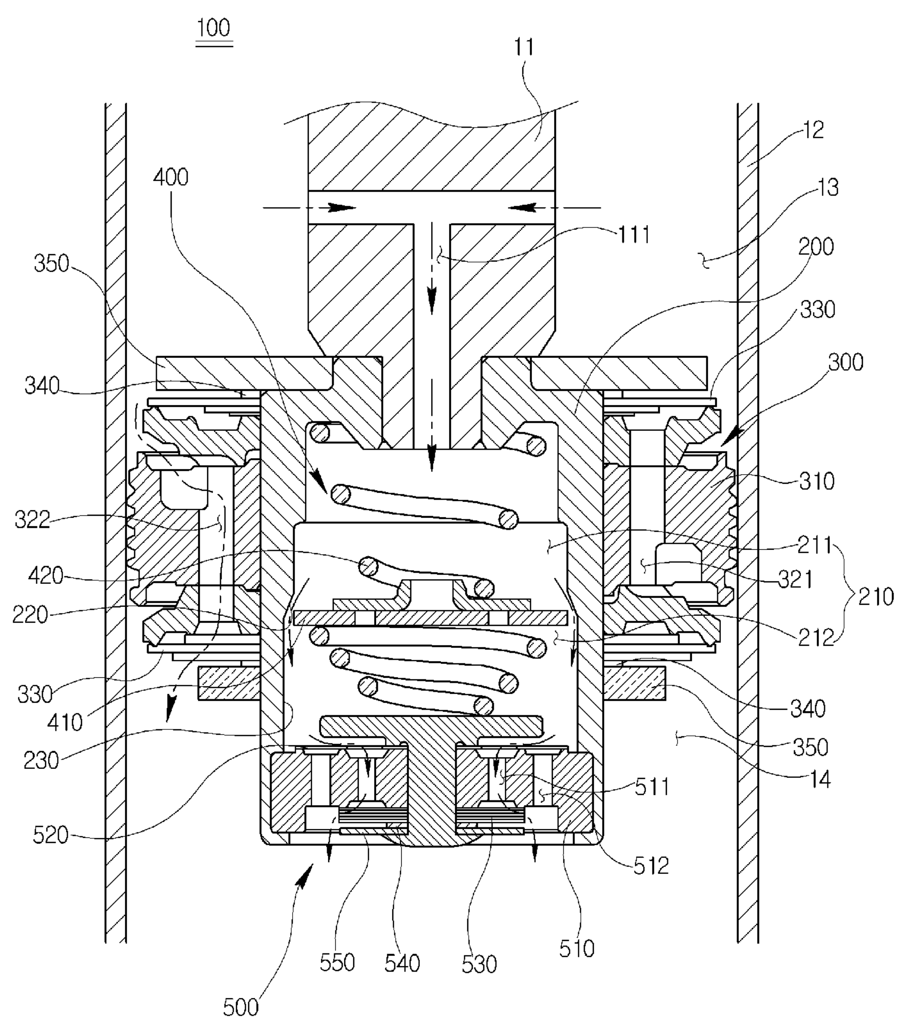
FIG. 4 is a cross-sectional view illustrating the operating state of the piston valve of the shock absorber according to the exemplary embodiment of the present invention when a low frequency shock is input.

FIG. 3 is a cross-sectional view illustrating the operating state of a piston valve of a shock absorber according to an exemplary embodiment of the present invention when a high frequency shock is input, and FIG. 4 is a cross-sectional view illustrating the operating state of the piston valve of the shock absorber according to the exemplary embodiment when a low frequency shock is input.

As illustrated in FIGS. 3 and 4, a piston valve 100 of a shock absorber according to an exemplary embodiment of the present invention is coupled to the lower end of a piston rod 11 in a state in which a frequency sensitive valve unit 400 is installed inside of a main valve unit 300.

More specifically, the piston valve 100 of the shock absorber according to the exemplary embodiment of the present invention includes a valve housing 200 coupled to the lower end of the piston rod 11, a frequency sensitive valve unit 400 installed in a space 210 within the valve housing 200, and a main valve unit 300 coupled to the outer circumferential surface of the valve housing 200.

Here, the piston rod 11 is installed in the axial direction in a cylinder 12 filled with hydraulic fluid, such as oil, and reciprocates within the cylinder 12. The cylinder 12 may be configured in a single tube form or in a form divided into an inner tube and an outer tube.

A cylindrical valve housing 200 is coupled to the lower end of the piston rod 11. In this event, the coupling of the valve housing 200 may be made by various methods such as press-fit and screw-coupling as needed. The space 210 for installing the frequency sensitive valve unit 400, which will be described later, is formed in the valve housing 200, and the lower end of the space 210 is opened.

The main valve unit 300 is coupled to the outer circumferential surface of the valve housing 200. The main valve unit 300 includes: a valve body 310 having an outer circumferential surface in close contact with the inner circumferential surface of the cylinder 12 so as to vertically divide the inside of the cylinder 12 into an extension chamber 13 and a compression chamber 14, a plurality of fluid channels formed through the valve body 310 in the vertical direction, and leaf valves 330 provided on the top surface and the bottom surface of the valve body 310, respectively, to open/close the fluid channels.

The fluid channels may be classified into a compression fluid channel 321 and an extension fluid channel 322 depending on whether they are opened at a compression stroke or an extension stroke according to the elevation of the piston rod 11. For example, at the compression stroke where the piston rod 11 is lowered, the hydraulic fluid of the compression chamber 14 flows upwardly toward the extension chamber 13 through the compression fluid channel 321 and an attenuation force is generated during this process.

In addition, retainers 340 and washers 350 are coupled to the outer circumferential surface of the valve housing 200 at the top side of the leaf valve 330 configured to open/close the compression fluid channel 321 and at the bottom side of the leaf valve 330 configured to open/close the extension fluid channel 322, so as to support the top and bottom sides of the leaf valves 330, respectively, and when the fluid channels are opened, to limit the flexural deformation of the leaf valves 330.

An orifice hole 111 is formed through the piston rod 11 to communicate with the space 210 of the valve housing 200. Here, a plurality of orifice holes 111 may be formed such that first ends of the orifices holes 111 are spaced apart from each other in the circumferential direction of the outer circumferential surface of the piston rod 11 and second ends of the orifice holes 111 extend to the lower end of the piston rod 11 along the central axis of the piston rod 11.

In the space 210 of the valve housing 200, a frequency sensitive valve unit 400 is installed. Here, the frequency sensitive valve unit 400 may include a free piston 410, and a pair of elastic members 420 which are provided at the top and bottom sides of the free piston 410.

The free piston 410 is made of a plate with a predetermined thickness. The outer circumferential surface of the free piston 410 is in close contact with the inner circumferential surface of the space 210 of the valve housing 200, so as to vertically divide the space 210 into an upper side and a lower side. Hereinafter, the upper side of the space 210 divided by the free piston 410 will be referred to as an upper chamber 211 and the lower side of the space 210 will be referred to as a lower chamber 212.

In addition, each of the elastic members 420 may be formed preferably by a coil spring and more preferably by a truncated cone-shaped coil spring. Thus, the occurrence of noise by shock or friction between the windings of the coil springs may be prevented when the coil springs are tensioned or compressed.

The frequency sensitive valve unit 400 serves to absorb a small shock of a low amplitude and high frequency. That is, while the free piston 410 moves up and down by the pressure of the hydraulic fluid flowing into the space 210, the small shock is absorbed by the elastic members 420. In this event, the extent by which the free piston 410 moves up and down may be determined by properly selecting the spring constant of the elastic members 420.

Figure 2:
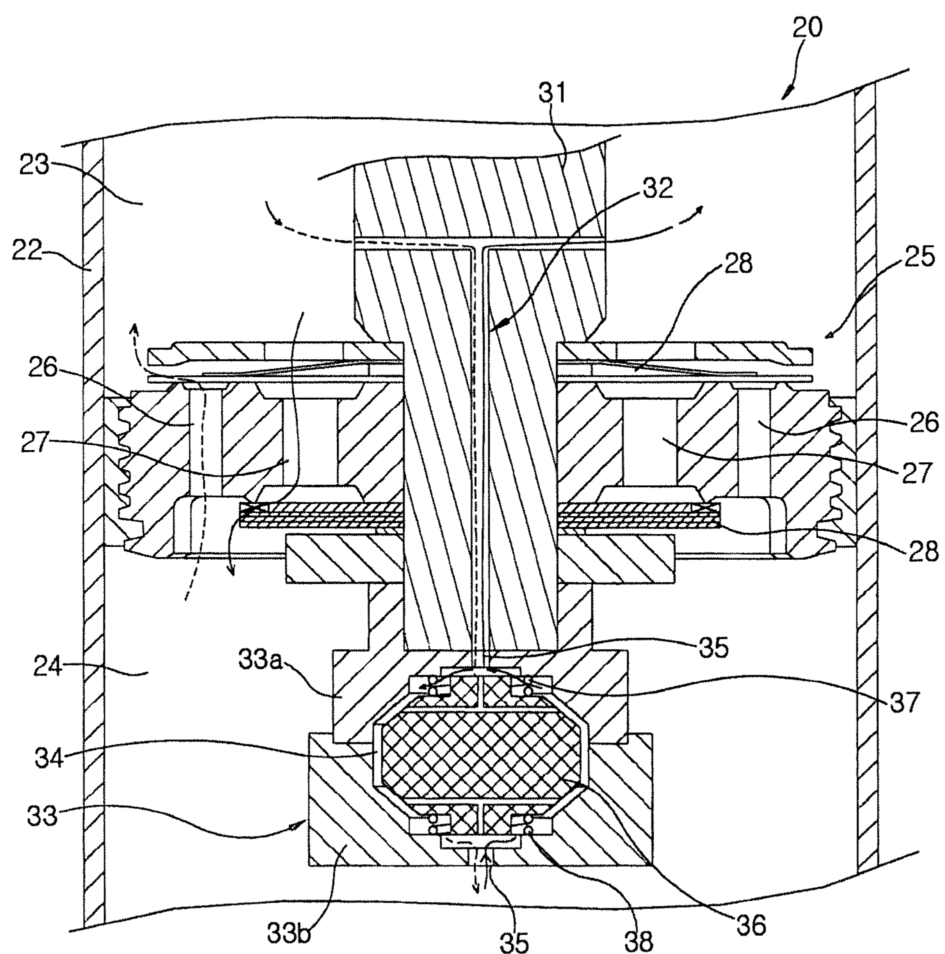
FIG. 2 is a cross-sectional view of a conventional frequency sensitive shock absorber for a vehicle.

In the prior art, as previously described with reference to FIG. 2, the pressure sensitive valve and the frequency sensitive valve are installed in series while being spaced apart from each other in the vertical direction, the entire length of the conventional shock absorber is relatively long.

However, according to the exemplary embodiment of the present invention, as illustrated in FIGS. 3 and 4, the frequency sensitive valve unit 400 is installed within the pressure sensitive main valve unit 300 using a single valve housing 200. As a result, the entire length of the shock absorber is reduced as compared to the conventional shock absorber, and the degree of freedom in installing and designing the shock absorber is thus improved.

Meanwhile, when a low frequency and high amplitude shock occurs in a moment, the upper chamber 211 and the lower chamber 212 of the space 210 of the valve housing 200 communicate with each other by the free piston 410 in order to efficiently attenuate the shock, and an additional attenuation force is generated while the hydraulic fluid, which has flown into the lower chamber 212 from the upper chamber 211, passes through the sub-valve unit 500 coupled to the lower end of the space 210. The sub-valve unit 500 may be coupled by a coupling method such as press-fit or screw coupling.

In order to allow the hydraulic fluid to flow from the upper chamber 211 of the valve housing 200 into the lower chamber 212, an width change portion 220 having a width increasing in the downward direction is formed along the circumferential direction at one side of the inner circumferential surface of the space 210 and a larger-width portion 230 is formed successively to the width change portion 220 so that the inner circumferential surface of the lower end of the width change portion 220 is wider than the inner circumferential surface of the upper end of the width change portion 220.

Therefore, when a low frequency and high amplitude shock occurs in a moment, the amount of the hydraulic fluid flowing into the upper chamber 211 through the orifice hole 111 rapidly increases, and the pressure of the hydraulic fluid flowing into the upper chamber 211 moves the free piston 410 down toward the larger-width portion 230 beyond the width change portion 220 as illustrated in FIG. 4.

Then, a gap is generated between the outer circumferential surface of the free piston 410 and the inner circumferential surface of the space 210 and, through the fluid channel formed by this gap, the hydraulic fluid of the upper chamber 211 flows into the lower chamber 212.

An attenuation force is generated while the hydraulic fluid, which has flowed into the lower chamber 212 as described above, passes through the sub-valve unit 500. The sub-valve unit 500 includes a valve body 510, extension orifices 511 formed through the valve body 510 in the vertical direction, and compression orifices 512 formed radially outside of the extension orifices 511.

The valve body 510 is coupled to the lower end of the space 210 of the valve housing 200 by a method such as press-fit or screw coupling, a suction valve 520 of a single plate configured to open/close the compression orifices 512 is provided at the upper side of the valve body 510, and a multi-plate disc 530 configured to open/close the extension orifices 511 is provided at the lower side of the valve body 510.

In addition, a retainer 540 and a washer 550 are sequentially stacked at the upper side of the suction valve 520 and at the lower side of the multi-plate disc 530, so as to support the suction valve 520 and the multi-plate disc 530 and to limit the flexural deformation of the suction valve 520 and the multi-plate disc 530.

Thus, when a momentary low frequency and high amplitude shock is input, the hydraulic fluid, which has flowed into the lower chamber 212 while pushing the free piston 410, flows into the compression chamber 14 while pushing the multi-plate disc 530 downward through the extension orifices 511 of the sub-valve unit 500 to open the multi-plate disc 530, thereby generating an attenuation force.

Meanwhile, as a modified exemplary embodiment, the washer 350 at the upper side of the valve body 310 and the valve housing 200 may be integrally formed. In addition, as still another modified exemplary embodiment of the present invention, the valve body 310 and the valve housing 200 may also be integrally formed without a separate coupling.

Further, when the main valve unit 300, the valve housing 200, the frequency sensitive valve unit 400, and the sub-valve unit 500 are assembled as one component module in advance and supplied to a manufacturing line, the number of steps of assembling the shock absorber may be reduced to improve the productivity.

Hereinbelow, with reference to an extension stroke as an example, the operation of the piston valve of the shock absorber according to the exemplary embodiment of the present invention will be described by breaking the operation into a case in which a low amplitude and high frequency shock is input and a case in which a high amplitude and low frequency shock is input.

Referring to FIG. 3, when a low amplitude and high frequency shock is input to such an extent that a difference of pressure hardly occurs between the extension chamber 13 and the compression chamber 14, an attenuation force is hardly generated through the compression fluid channel 321 and the extension fluid channel 322 of the main valve unit 300.

Then, the hydraulic fluid flows into the upper chamber 211 of the space 210 in the valve housing 200 through the orifice hole 111 in the piston rod 11, and the free piston 410 supported by the elastic members 420 floats up and down according to the flow of the hydraulic fluid, thereby attenuating the shock.

Thus, the small vibration from a road surface may be absorbed by the flow of the hydraulic fluid through the orifice hole 111 and the floating of free piston 410, thereby improving ride the comfort.

In this event, the free piston 410 floats up and down in a state where the outer circumferential surface of the free piston 410 is in close contact with the inner circumferential surface of the space 210. Further, since the free piston 410 does not pass the width change portion 220, the hydraulic fluid is prevented from flowing from the upper chamber 211 of the space 210 to the lower chamber 212.

Meanwhile, as illustrated in FIG. 4, when a high amplitude and low frequency shock is input in a moment, an attenuation force is generated through the compression fluid channel 321 and the extension fluid channel 322 of the main valve unit 300 and an attenuation force is additionally generated by the sub-valve unit 500.

When the amount of the hydraulic fluid flowing into the upper chamber 211 in the space 210 of the valve housing 200 through the orifice hole 111 of the piston rod 11 increases in a moment, the free piston 410 is moved down beyond the width change portion 220 by the pressure of the hydraulic fluid. Then, the hydraulic fluid of the upper chamber 211 flows into the lower chamber 212 through the gap formed between the outer circumferential surface of the free piston 410 and the inner circumferential surface of the space 210.

The hydraulic fluid introduced into the lower chamber 212 generates an attenuation force while passing through the sub-valve unit 500 and flows out of the lower chamber 212 into the compression chamber 14 through the orifices 511 of the sub-valve unit 500. Thus, the momentary low frequency shock applied from the road surface is absorbed by the hydraulic fluid passing through the main valve unit 300 and the hydraulic fluid passing through the frequency sensitive valve unit 400 and the sub-valve unit 500.

That is, with the shock absorber of the piston valve 100 according to the exemplary embodiment of the present invention, a variable frequency characteristic input from a road surface may be controlled through the frequency sensitive valve unit 400 and a pressure additionally generated according to a variation of speed may be controlled through the sub-valve unit 500. As a result, ride comfort, behavior stability of a vehicle, and handling performance during driving of the vehicle may be enhanced.

What is claimed is:

1. A piston valve of a shock absorber, comprising:

a main valve unit coupled to a lower end of a piston rod which has an orifice hole, to divide an inside of a cylinder into an extension chamber and a compression chamber, the main valve unit generating an attenuation force according to a difference of pressure between the extension chamber and the compression chamber; and a frequency sensitive valve unit installed at one side of the main valve unit and configured to generate an attenuation force according to a frequency of hydraulic fluid delivered through the orifice hole of the piston rod; and a valve housing having a space which communicates with the orifice hole and coupled to the lower end of the piston rod, so that the main valve unit is coupled to an outer circumferential surface of the valve housing and the frequency sensitive valve unit is installed in the space of the valve housing, wherein the valve housing has a variable inner diameter so that an inner diameter at which the valve housing and the lower end of the piston rod are coupled is smaller than an inner diameter at which the frequency sensitive valve unit is installed in the space, and the frequency sensitive valve unit is installed within the main valve unit.

2. The piston valve of claim 1, wherein the valve housing and the main valve unit are integrally formed.

3. The piston valve of claim 1, wherein the valve housing comprises:

a width change portion having a width increasing conically in a downward direction of the hydraulic fluid along a circumferential direction at one side of an inner circumferential surface of the space; and a larger-width portion formed successively to the width change portion toward the opposite side of the coupled portion of the piston rod and the valve housing in the space such that an inner circumferential surface of a lower end of the width change portion is wider than an inner circumferential surface of an upper end of the width change portion.

4. The piston valve of claim 1, wherein the frequency sensitive valve unit comprises a free piston which vertically divides the space into an upper chamber and a lower chamber, and a pair of elastic members provided at a top side and a bottom side of the free piston, respectively.

5. The piston valve of claim 4, further comprising a sub-valve unit coupled to a lower end of the space in the valve housing, the sub-valve unit having at least one orifice formed through the sub-valve unit, wherein the lower chamber and the compression chamber communicate with each other through the at least one orifice.

6. The piston valve of claim 5, wherein the at least one orifice includes: an extension orifice formed through a valve body of the sub-valve unit; and an compression orifice formed radially outside of the extension orifice.

7. The piston valve of claim 5, wherein the sub-valve unit further includes: a multi-plate disc for opening and closing the extension orifice which is formed at a lower side of the valve body; and a retainer and a washer sequentially stacked below the multi-plate disc.

8. A piston valve of a shock absorber, comprising:

a main valve unit coupled to a lower end of a piston rod which has an orifice hole, to divide an inside of a cylinder into an extension chamber and a compression chamber, the main valve unit generating an attenuation force according to a difference of pressure between the extension chamber and the compression chamber;

a frequency sensitive valve unit installed at one side of the main valve unit and configured to generate an attenuation force according to a frequency of hydraulic fluid delivered through the orifice hole of the piston rod; and a valve housing having a space which communicates with the orifice hole is coupled to the lower end of the piston rod, wherein the valve housing has a variable inner diameter so that an inner diameter at which the valve housing and the lower end of the piston rod are coupled is smaller than an inner diameter at which the frequency sensitive valve unit is installed in the space, the frequency sensitive valve unit is installed within the main valve unit, the main valve unit is coupled to an outer circumferential surface of the valve housing, and the frequency sensitive valve unit is installed in the space of the valve housing.

* * * * *